(12) United States Patent
Basu et al.

(10) Patent No.: US 7,636,325 B2
(45) Date of Patent: Dec. 22, 2009

(54) DETERMINING HIGHEST WORKLOADS FOR NODES IN AN OVERLAY NETWORK

(75) Inventors: Sujoy Basu, Menlo Park, CA (US);
Sujata Banerjee, Sunnyvale, CA (US);
Puneet Sharma, Palo Alto, CA (US);
Sung-Ju Lee, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 875 days.

(21) Appl. No.: 11/006,068

(22) Filed: Dec. 7, 2004

(65) Prior Publication Data

US 2006/0120391 A1   Jun. 8, 2006

(51) Int. Cl.
*H04L 12/28* (2006.01)
(52) U.S. Cl. .................. 370/254; 370/351; 709/220
(58) Field of Classification Search .................. None
See application file for complete search history.

(56) References Cited

U.S. PATENT DOCUMENTS

| | | | |
|---|---|---|---|
| 5,539,883 A * | 7/1996 | Allon et al. .................. 718/105 |
| 6,389,448 B1 | 5/2002 | Primak et al. | |
| 6,691,165 B1 | 2/2004 | Bruch et al. | |
| 6,820,262 B1 * | 11/2004 | Tellez et al. .................. 718/106 |
| 6,965,930 B1 | 11/2005 | Arrowood et al. | |
| 7,197,573 B1 * | 3/2007 | Jacobson et al. ............ 709/239 |
| 7,296,268 B2 | 11/2007 | Darling et al. | |
| 7,353,538 B2 | 4/2008 | Sample | |
| 7,389,510 B2 | 6/2008 | Forrester | |
| 2002/0059451 A1 | 5/2002 | Haviv | |
| 2002/0107962 A1 | 8/2002 | Richter et al. | |
| 2002/0178261 A1 | 11/2002 | Chang | |
| 2003/0110291 A1 * | 6/2003 | Chen .......................... 709/244 |
| 2004/0143842 A1 | 7/2004 | Joshi | |
| 2005/0047420 A1 * | 3/2005 | Tanabe et al. .......... 370/395.52 |
| 2005/0268102 A1 * | 12/2005 | Downey ..................... 713/176 |

FOREIGN PATENT DOCUMENTS

WO   WO2004/086720   10/2004

OTHER PUBLICATIONS

Andrezejak, A. et al., "Scalabe, Efficient Range Queries for Grid Information Services", HP Labs Technical Report HPL-2002-209, Jul. 2002.
Balazinska, M. et al, "Twine: A Scalabe Peer-to-Peer Architecture for Intentional Resource Discovery", Lecture Notes in Computer Science, 2002.
Czajkowski, K. et al., "Grid Information Services for Distributed Resource Sharing", Proc. 10th IEEE International Symposium on High Performance Distributed Computing, 2001.

(Continued)

*Primary Examiner*—Hong Cho
*Assistant Examiner*—Robert C Scheibel

(57) ABSTRACT

Nodes in a network are operable to provide an information service. A set of the nodes having a highest workload are identified by routing a list of workloads for the nodes through the network to a final destination. Each node receiving the list determines whether to include a workload of a respective node in the list.

35 Claims, 12 Drawing Sheets

OTHER PUBLICATIONS

Ganesan, P. et al., "One Torus to Rule Them All: Multi-Dimensional Quereis in P2P Systems", Stanford University; 2004.

Iamnitchi, A. et al., "A Peer-to-Peer Approach to Resource Location in Grid Environments", Univ. of Chicago Technical Report TR-2002-06.

Oppenheimer, D. et al. "Scalable Wide-Area Resource Discovery", Univ. Of California, Berkely, San Diego; downloaded 2004. http://www.cs.berkely.edu/~davidopp/sword/; downloaded 2004.

* cited by examiner

DETERMINING HIGHEST WORKLOADS FOR NODES IN AN OVERLAY NETWORK

TECHNICAL FIELD

This invention relates generally to networks. More particularly, the invention relates to workloads for nodes in a network.

BACKGROUND

Large networks, such as the Internet, which may provide the infrastructure for many peer-to-peer systems, are now being used to provide a variety of services to users. For example, media services, such as streaming and transcoding, web-services for e-commerce, such as airline and hotel reservations, or grid computing services for computation and data may be available via large networks.

A fundamental challenge in effectively utilizing these network services is to efficiently and quickly locate desired services in large networks, such as the Internet. The challenge of discovering services is complicated by several factors. For example, if a centralized information service for facilitating such discovery were used, such as a centralized information service used for peer-to-peer file sharing systems, it would not easily scale as the number of available services and number of users increases. In addition, each service has several dynamic attributes, e.g., load and latency, that keep changing and need to be updated in the information service. The desired update rate may not be sustained by a centralized information service. Also, providing an information service with minimal downtime may require several system administrators to maintain and would be costly. Finally, the information service should be locality-aware for faster response times. For example, a query including a request for a desired service should be directed to a node in the network proximity of the node initially sending the query, and the services returned as a response to the query should also be in the network proximity of the querying node.

SUMMARY

According to an embodiment, nodes in a network are operable to provide an information service. A set of the nodes having a highest workload are identified by routing a list of workloads for the nodes through the nodes in the overlay network to a final destination in the network. Each node receiving the list determines whether to include a workload in the list.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF THE EMBODIMENTS

Figure 1:
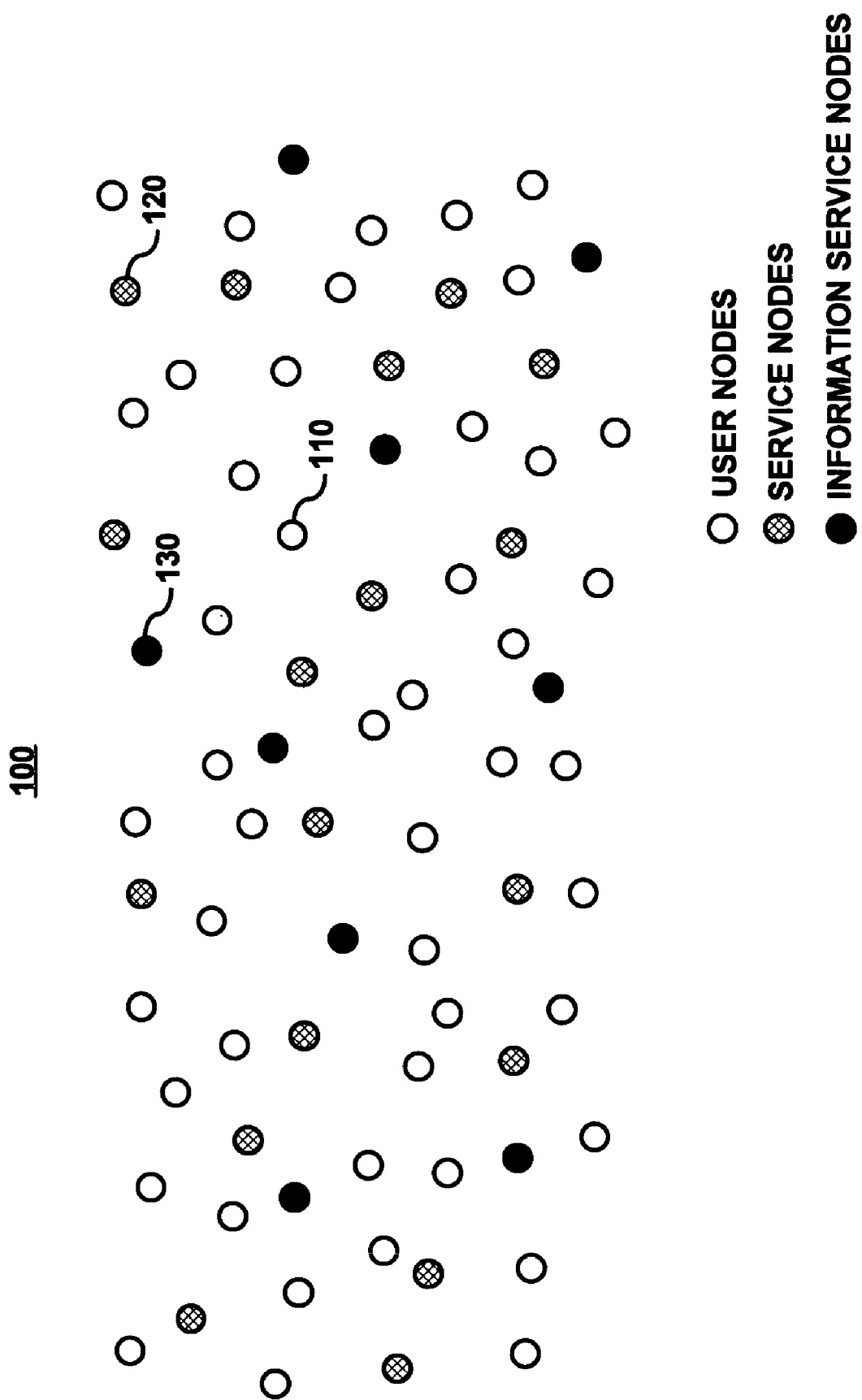
FIG. 1 illustrates a network, according to an embodiment.

For simplicity and illustrative purposes, the principles of the embodiments are described. However, one of ordinary skill in the art would readily recognize that the same principles are equally applicable to, and can be implemented in, all types of network systems, and that any such variations do not depart from the true spirit and scope of the embodiments. Moreover, in the following detailed description, references are made to the accompanying figures, which illustrate specific embodiments. Electrical, mechanical, logical and structural changes may be made to the embodiments without departing from the spirit and scope of the embodiments.

According to an embodiment, a distributed information service is provided for discovering services in a network. The information service provides users with information about services available via the network. A user queries the information service for information about desired services available via the network. The information service may respond with a list of service nodes in the network that are operable to provide the desired service.

The information service is a distributed information service including a plurality of information service nodes in a peer-to-peer network storing information about the available services. Unlike conventional peer-to-peer networks where the nodes tend to be transient, the information service nodes are stable nodes in a peer-to-peer architecture that are more likely to remain in the peer-to-peer network for an extended period of time rather than joining the peer-to-peer network for a short period of time. It will be apparent to one of ordinary skill in the art that the peer-to-peer network is one example of organizing the information service nodes in a distributed architecture and any type of distributed architecture may be used.

The distributed nature of the information service minimizes the bottleneck associated with using a conventional, central information repository that handles all queries for information, and thus improves query response times. An overlay network for the peer-to-peer network is used to efficiently route queries and information about services in the distributed information service for facilitating the discovery of available services in a network.

A service as used herein refers to any function that operates on an input and produces an output. Examples of services include transcoding, language translation, encryption, image repair and analysis, error correction, converting content into different languages, etc. Also, a service may be composed of multiple services. For example, an output of one service may be the input of another service, and so on for as many intermediate services that are used to compose the service. An example of a composed service may include a media service including a video streaming service input into a transcoding service such that a user may receive streaming video in a format viewable on a particular end-user device.

Other types of services include computation services, data storage services, and grid computing services, which may encompass sharing of computer resources. A grid computing service, for example, allows users access to computing services based on specifications, such as application requirements.

1. System Overview

FIG. 1 illustrates a network 100 including user nodes 110, service nodes 120, and information service nodes 130. An example of the network 100 includes a large-scale network, such as the Internet, where services are made available to users. However, the embodiments may be implemented in smaller networks providing services. User nodes include any node operable to receive a service. Typically, a user node submits a query to an information service for determining whether a service desired by a user is available in the network 100, and if the service is available, which service node to contact for receiving the service. The service nodes 120 include nodes operable to provide services. After a user node identifies a service node operable to provide a desired service by querying the information service, the user node receives the service from the service node providing the desired service. A node is any device that may send and/or receive messages via the network and that is typically operable to perform some type of data processing. Examples of nodes include routers, servers, and end-user devices, such as PDA's, personal computers, laptops, and cellular phones.

The information service, according to an embodiment, is provided by the information service nodes 130. The information service nodes 130 allow for the discovery of services in the network 100. In addition to service discovery, the information service nodes 130 balance workloads among themselves using several techniques described herein and perform routing as described in copending U.S. patent application Ser. No. 11/006,041 entitled "Routing A Service Query In An Overlay Network" by Sujoy Basu et al., now U.S. Pat. No. 7,567,196, both of which are incorporated by reference in their entireties. As described above, the information service including the information service nodes 130 perform functions associated with the discovery of services in the network 100. Two important functions include the storing of information about available services and responding to queries about available services. The information service nodes 130 are provided in a peer-to-peer network 200, shown in FIG. 2, in the network 100. The peer-to-peer network 200 and an overlay network 210 for the peer-to-peer network 200 are used for, among other things, storing information about services in the information service nodes 130, for routing among the information service nodes 130, and for responding to queries.

Figure 2:
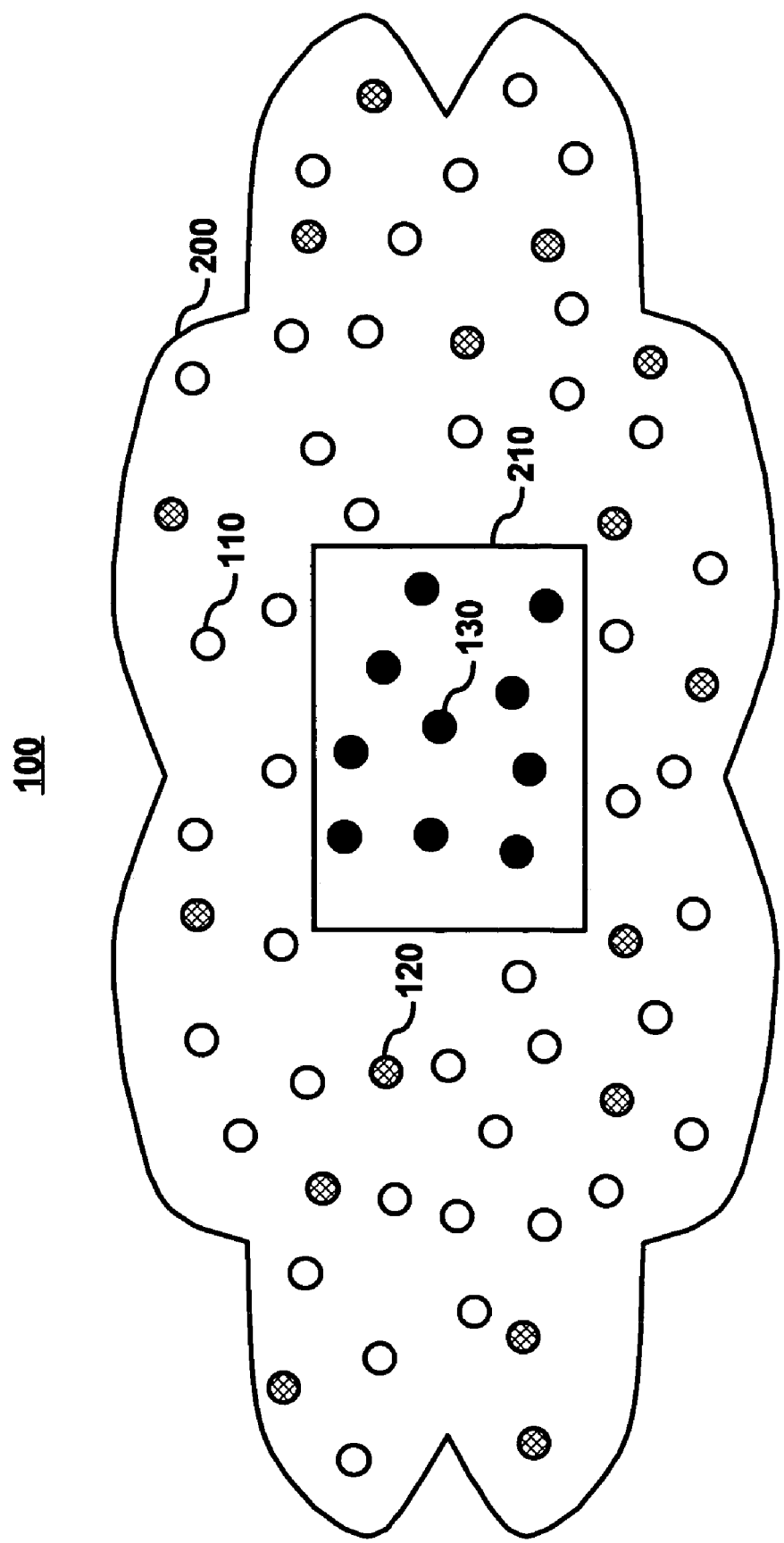
FIG. 2 illustrates an overlay network in a peer-to-peer network, according to an embodiment.

As shown in FIG. 2, the overlay network 210 overlays the underlying peer-to-peer network 200. The overlay network 210 is a logical representation of the peer-to-peer network 200 and is operable to efficiently route queries and service information based on attributes and attribute ranges used to define services, as described in detail below. FIG. 2 illustrates the information service nodes 130 centrally located in the network 100 and the user nodes 110 and the service nodes 120 provided around the overlay network 210 for purposes of illustrating that the peer-to-peer network 200 includes the information service nodes 130 and that the user nodes 110 and the service nodes 120 communicate with the information service nodes 130 in the peer-to-peer network 200 as needed. The information service nodes 130 may be provided in several different areas of the network 100 to minimize latency, e.g., the length of time it takes a user node to get a response to a query response.

2. The Attribute Space and Attribute Subspaces

A service is characterized by specifying values for various service attributes. For example, a computing service may be characterized by the values of attributes, such as operating system and applications, amount of physical memory, disk space, and network bandwidth.

The information service tracks these attributes and attribute values. Each information service node has the responsibility for tracking a certain set of values for one or more of the attributes. The combination of the sets of attribute values for all the tracked attributes forms the attribute subspace tracked by that information service node.

Figure 3:
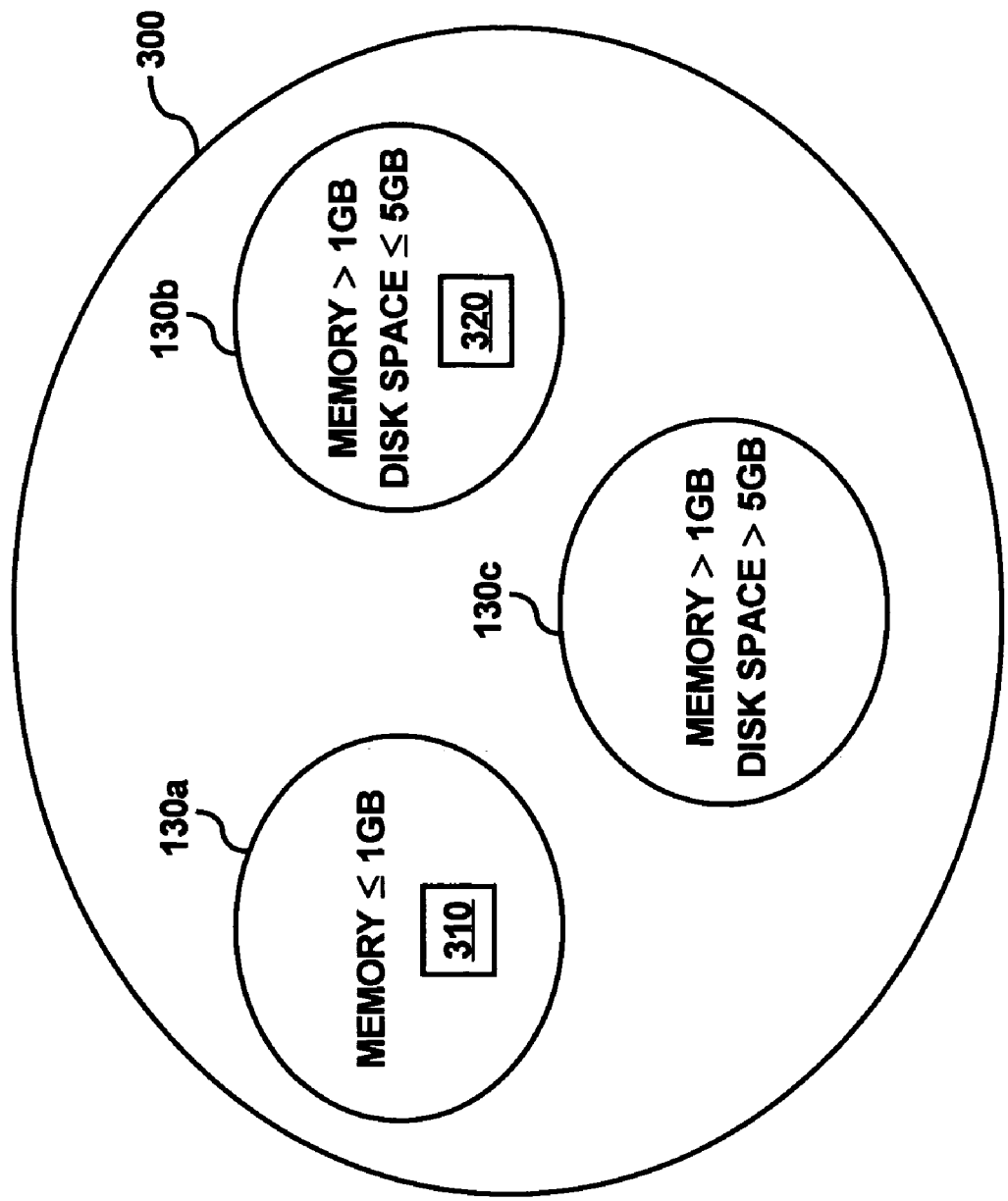
FIG. 3 illustrates an attribute space and attribute subspaces, according to an embodiment.

The information service, comprised of the information service nodes 130, includes an attribute space 300 shown in FIG. 3. The attribute space 300 includes all the information about available services in the peer-to-peer network 100. The attribute space 300 is a logical representation of the information stored in the information service.

The attribute space 300 is distributed among the information service nodes 130. Only three information service nodes 130a-c are shown in FIG. 3 for purposes of illustration. Each of the information service nodes 130 is assigned responsibility for an attribute subspace in the attribute space 300. Each attribute subspace is associated with particular attributes and attribute values. In the information service, a service is defined by predetermined attributes and attribute values that vary by service. Attributes and attribute values are assigned to each of the information service nodes 130. A service is determined to fall within an attribute subspace of an information service node, and thus information about that service is ultimately stored in that information service node, if the attributes and attribute values for the service match the attributes and attribute values assigned to the attribute subspace for the information service node. For example, an attribute subspace may include attribute values for a particular attribute. If a service is defined using one or more attribute values that intersect the attribute values of an attribute subspace, the service may fall within the attribute subspace. An example further describing the attribute subspaces is as follows. A list of predetermined attributes for defining all the services in the network 100 may include memory, disk space, average load, operating system, applications, service uptime, and response time. A grid computing service may include the sharing of computer resources. A grid computing service, e.g., grid computing service 1, may be defined based on the computer resources that can be shared. Grid computing service 1 is defined using the following attribute values:

TABLE 1 of Attributes and Attribute Values for Grid Computing Service 1

Memory: 1 GB
Disk Space: 2.5-5 GB
Operating System: Linux 2.4
Average Load: 0
Applications: Maya, Renderman
Service Uptime: 99.5%
Response Time: < =20 ms As shown in FIG. 3, the information service node 130a is assigned the attribute subspace defined by the attribute values of memory<=1 GB. An advertisement 310 for the grid computing service 1, which includes the attribute values in Table 1, is stored at the information service node 130a because the information service node 130*a* stores all advertisements having a memory attribute value<=1 GB.

An advertisement includes the attributes and attribute values used to define a particular service. A predetermined set of attributes may be used to define all services in the network 100. Each of the service nodes 120 measures or otherwise determines the attribute values for each of the attributes in the predetermined set of attributes. Each of the service nodes 120 also periodically sends their advertisements to the information service. The overlay network 210 automatically routes the advertisements to the appropriate information service node owning the attribute subspace where the advertisement falls. The attributes and attribute values shown above for the grid computing service 1 is an example of the information in the advertisement 130 for the grid computing service 1. For example, a service node providing the grid computing service 1 periodically measures or otherwise determines the attribute values for the grid computing service 1 shown in Table 1 and transmits the advertisement 310 including the attribute values to the overlay network 210 for storage in the information service node owning the attribute subspace where the advertisement falls. In the example shown in FIG. 3, the information service nodes 130 routed an advertisement 310 for the grid computing service 1 to the information service node 130*a*, because the information service node 130*a* stores all the information about services, transmitted to the overlay network 210, having an attribute value within memory<=1 GB. That is the grid computing service 1 is defined using an attribute value of 1 GB for the memory=attribute, and the 1 GB attribute value intersects, i.e., is included in the attribute range of memory<=1 GB for the attribute subspace of the information service node 130*a*. Thus, the grid computing service 1 falls within the attribute subspace of the information service node 130*a*.

The attributes shown above for the grid computing service 1 are examples of the predetermined set of attributes used to define services in the network 100. It will be apparent to one of ordinary skill in the art that other attributes may be used to define the available services. Also, a predetermined set of attributes may be used to define the services. However, each service may have different attribute values, which are periodically measured and stored in the information service node having the corresponding attribute subspace.

Queries are similarly stored in the peer-to-peer network 200. For example, the overlay network 210 shown in FIG. 2 may receive a query 320 shown in FIG. 3 including a request for a service with an attribute of memory>1 GB and disk space=2 GB. The query 320 falls in the attribute subspace owned by the information service node 130*b*. Thus, the query 320 is routed through the overlay network 210 to the information service node 130*b*. The query 320 is automatically routed to and stored in the information service node 130*b*, and the information service node 130*b* responds to the query by searching the advertisements stored in the information service node 130*b* and sending any matches to the node requesting the service.

The overlay network 210, including the attribute space 300, supports range queries. Range queries include one or more attribute ranges that identify a desired service. The information service nodes 130, using the overlay network 210, are operable to route range queries to an attribute subspace including the range of attribute values or an attribute subspace intersecting the range of attribute values in the query. In addition, the query may include multiple attribute ranges, and the query may be routed to more than one information service node having an attribute subspace including or intersecting an attribute range.

3. Information Service Node

Figure 4:
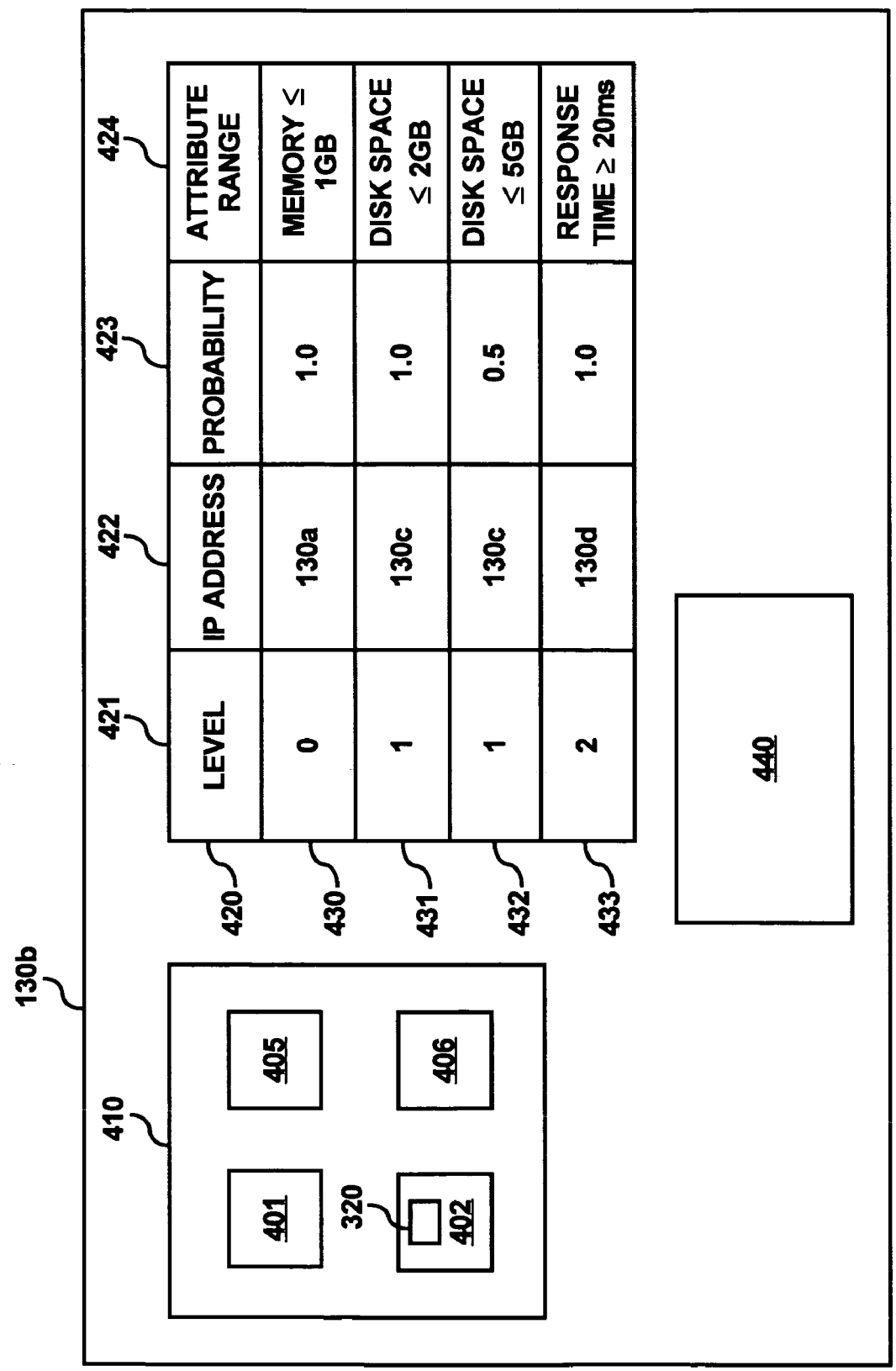
FIG. 4 illustrates information stored in an information service node, according to an embodiment.

FIG. 4 illustrates an example of some of the information stored in an information service node, such as the information service node 130*b*. The information service node 130*b* includes a storage cache 410, an overlay routing table 420, and a replica location cache 440. The storage cache 410 stores local queries 401 and global queries 402. The storage cache 410 also stores local advertisements 405 and global advertisements 406. The global queries 402 include queries that are routed through the overlay network 210 to the information service node 130*b*, because the queries fall in the attribute subspace owned by the information storage node 130*b*. The query 320 shown in FIG. 3 is an example of a global query.

The local queries 401 include any query received by the information service node 130*b*. For example, the information service node 130*a* may receive a query and forward the query towards its destination in the overlay network 210, which may include the information service node owning the attribute subspace where the query falls. Before forwarding the query toward its destination, the query is locally cached in the storage cache 410. Also, the information service node 130*b*, before forwarding the query towards its destination, searches the local advertisements 405 stored in the storage cache 410 to determine whether any matches to the query are found. If a match is found, the information service node 130*b* responds to the query, for example, by sending the matching advertisement to the node requesting the service and the associated service node. The information service node 130*b* may continue to route the query toward its destination, because the destination may include advertisements for services matching the query that are provided by service nodes closer to the node requesting the service. Alternatively, the information service node 130*b* may not forward the query if a match is locally cached.

The global advertisements 406 include advertisements that are routed through the overlay network 210 to the information service node 130*b*, because the advertisements fall in the attribute subspace owned by the information storage node 130*b*. The advertisement 310 shown in FIG. 3 is an example of a global advertisement for the information service node 130*a*.

The local advertisements 405 include any advertisement received by the information service node 130*a*. For example, the information service node 130*a* may receive an advertisement and forward the advertisement towards its destination. These advertisements are locally cached in the storage cache 410 and may be searched to provide faster response times for queries if matches are found in the local cache.

The information service node 130*b* also includes the overlay routing table 420. The overlay routing table 420 includes the following fields: level 421, IP address 422, probability 423, and attribute range 424. The level 421 is generally associated with the number of times the information service node 130*b* has split its workload with another information service node. When the information service node 130*b* splits its workload with another information service node, a new entry in the routing table in the information service node 130*b* is created at a level greater than the existing highest level in the routing table. For example, the entries 431 and 432 were created at level 1 when the information service node 130*b* split its workload with the information service node 130*c*. The entry 433 was created at level 2 when the information service node 130*b* subsequently split its workload with the information service node 130*d*. Workload splitting may be performed when a determination is made that an information service node has a high workload in comparison to other information service nodes in the overlay network 210. The probabilities 423 indicates the probability that an information service node will have the desired data. For example, the entry 430 indicates that the information service node 130a always stores advertisements with memory<=1 GB, and the entry 431 indicates that the information service node 130c always stores advertisements with disk space<=2 GB. However, the information service node 130c has a 50% probability of storing advertisements with disk space<=5 GB. Generating the entries in the routing tables and the probabilities are described in further detail in the U.S. patent applications incorporated by reference above.

The IP address field 422 in the routing table 420 is for identifying the destination of an information service node in a particular entry. For example, if the information service node 130b receives an advertisement and determines the advertisement has a memory attribute<1 GB, the information service node 130b uses the entry 430 to route the advertisement to its next destination, e.g., the information service node 130a. The IP address of the information service node 130a may be provided in the IP address field of the entry 430, and the information service node 130b uses IP routing to transmit the message to the information service node 130a in the network 200.

The replica location cache 440 stores information associated with the number of times each service node is contacted and latencies for the service nodes that have been contacted. A replica is a copy of an information service node. For example, an information service node may be duplicated at a new location in the network 100 if it is determined that the original information service node has been contacted frequently by user nodes in one area of the network 100 and/or user nodes receiving messages, such as responses to queries, from the original information service node have been experiencing high latencies to the information service node. The information service node 130b may use the information in the replica location cache 440 to determine whether to add a replica in another area of the network 100 to reduce latency.

4. Routing

Figure 5:
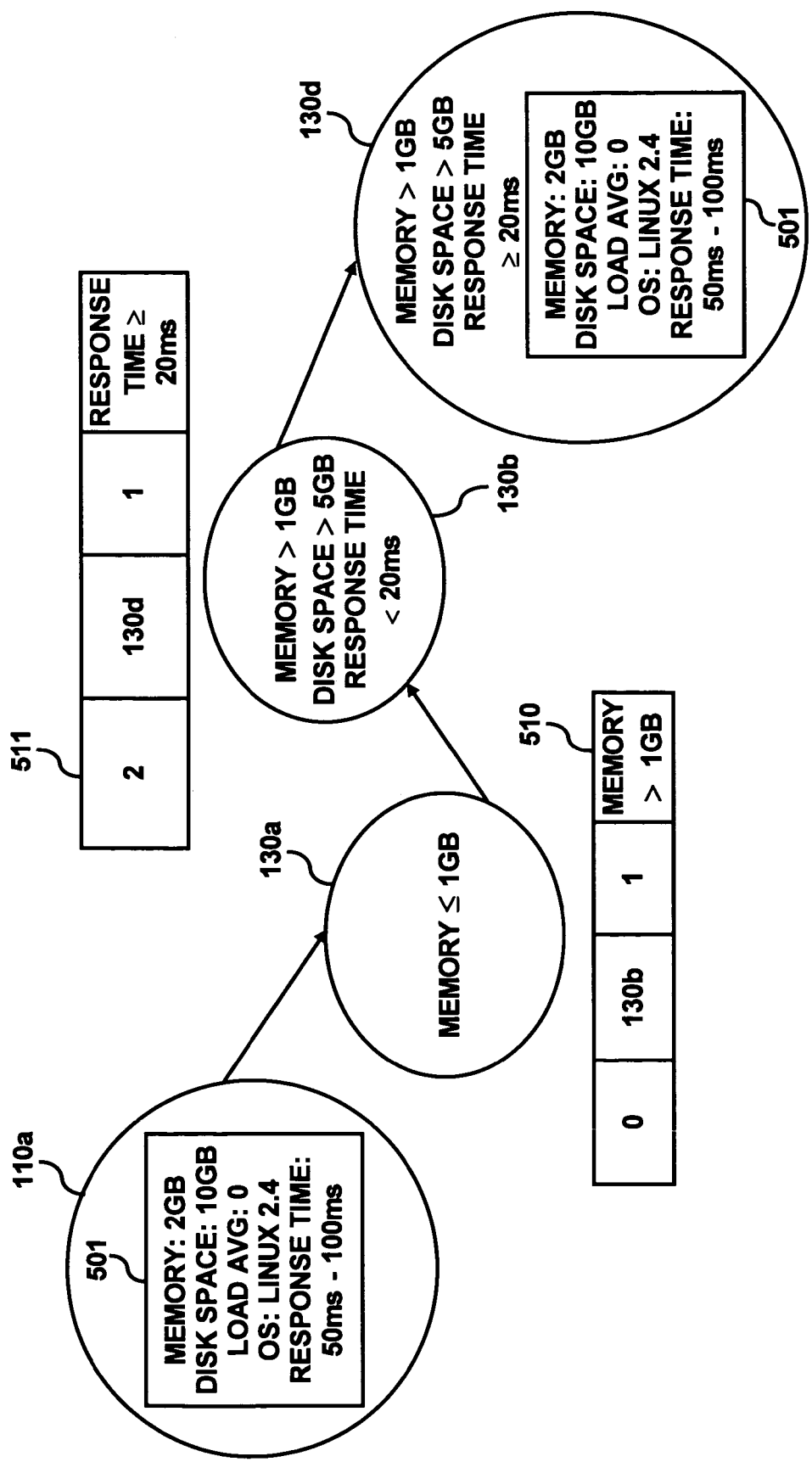
FIG. 5 illustrates routing a query, according to an embodiment.

FIG. 5 illustrates an example of routing a query 501 in the overlay network 210. A user node 110a transmits the query 501 to an information service node, e.g., the information service node 130a, in the overlay network 210. In one example, the information service node that the user node 110a makes initial contact with in the overlay network 210 may be selected based on network proximity. For example, during an initialization step when the user node 110a joins the peer-to-peer network 100, the user node 110a receives a message from an information service node indicating the IP address of the information service node in close network proximity to the user node 110a. An example of determining location information for nodes using distances measured based on a network metric, such as latency, number of hops, etc. is described in U.S. patent application Ser. No. 10/767,285, filed Jan. 30, 2004, and entitled "Selecting Nodes Close To Another Node In A Network Using Location Information For The Nodes" by Zhichen Xu et al., which is assigned to the assignee of the present application. The location information is used to determine network proximity to other nodes in the network and can be used to select a closest information service node. Other techniques for determining distances and location information for nodes in a network may also be used.

After the user node 110a identifies an information service node in close proximity, e.g., the information service node 130a, the user node 110b transmits the query 501 to the information service node 130a. The query 501 includes attribute values defining a service desired by the user node 110a. The attribute values may be a range or a single value. In this example, the query 501 includes the following attribute values:

TABLE 2 of the Attributes and Attribute Values for the Query 501

Memory: 2 GB
Disk Space: 10 GB
Operating System: Linux 2.4
Response Time: 50-100 ms The information service node 130a receives the query 501. The attribute subspace for the information service node 130a includes memory<=1 GB. The query 501 includes an attribute value of 2 GB for memory. The 2 GB attribute value is not included in the attribute range of memory<=1 GB for the attribute subspace of the information service node 130a, and thus the query 501 does not fall in the attribute subspace of the information service node 130a.

The information service node 130a identifies an information service node from its routing table that includes the attribute values of the query 501. For example, the information service node 130a starts with the lowest level entry, e.g., level 0, and searches its routing table for an entry including attribute values that intersect the attribute values in the query 501. An entry 510 is shown which includes: level 0, IP address for the information service node 130b, probability of 1, and memory>1 GB. Based on the entry 510, the information service node 130a transmits the query 501 to the information service node 130b. The attribute subspace for the information service node 130b includes response time<20 ms which is not included in the response time range of 50-100 ms specified in the query 501. Thus, the information service node 130d searches its routing table and finds, for example, the entry 511. The entry 511 identifies the information service node 130d and the query 501 is transmitted to the information service node 130d. The information service node 130d has an attribute subspace including the attribute values of the query 501, and thus the query 501 falls in that attribute subspace. The information service node 130a determines whether any advertisements stored in its global cache satisfy the query. For example, a service may need to have all the attribute values specified in the query 501 for it to be considered a match. If a match is found, the information service node 130a responds to the query 501 by sending the advertisement, including, for example, the IP address of the service node providing the service, to the user node 110a. The information service node 130a may also send a message to the service node for the advertisement, along with the IP address of the user node 110a, indicating that the user node 110a is requesting the service described in the advertisement. The query 501 is also stored in the global cache of the information service node 130c.

The information service nodes 130a and 130b may store a copy of the query 501 in its local cache before forwarding the query 501. Also, the information service nodes 130a and 130b may determine whether any advertisements stored in its local cache satisfy the query 501 before forwarding the query. If a match is found, the information service node 130a may respond to the query 501 by sending the advertisement, including, for example, the IP address of the service node providing the service, to the user node 110a. The information service node 130a may also send a message to the service node providing the service described in the advertisement, along with the IP address of the user node 110a, indicating that the user node 110a is requesting the service in the advertisement.

In the example described above with respect to FIG. 5, the query 501 is routed to the information service node 130d because the query 501 falls in the attribute subspace of the information service node 130d. The query 501 may continue to be routed to other information service nodes that may include advertisements matching the query 501. For example, another information service node may include the following attribute subspace: memory>1 GB, disk space>5 GB, response time>=20 ms, and operating system including Linux 1.0-2.5. The information service node 130d may route the query 501 to the information service node including the attribute subspace described above, because the query 501 also falls in that attribute subspace. Thus, the user node 110a may receive search results from multiple information service nodes, including information service nodes finding matches in their local caches, and the user node 110a may select a service node for receiving the desired service.

In addition, it should be noted that the overlay network 210 supports range queries. The query 501 includes a range of attribute value, 50-100 ms, for the attribute response time. The query 501 may include one or more ranges, and is routed to information service nodes intersecting the range. For example, the query 501 may be routed to an attribute subspace including any of the attribute values 50-100 ms.

Figure 6:
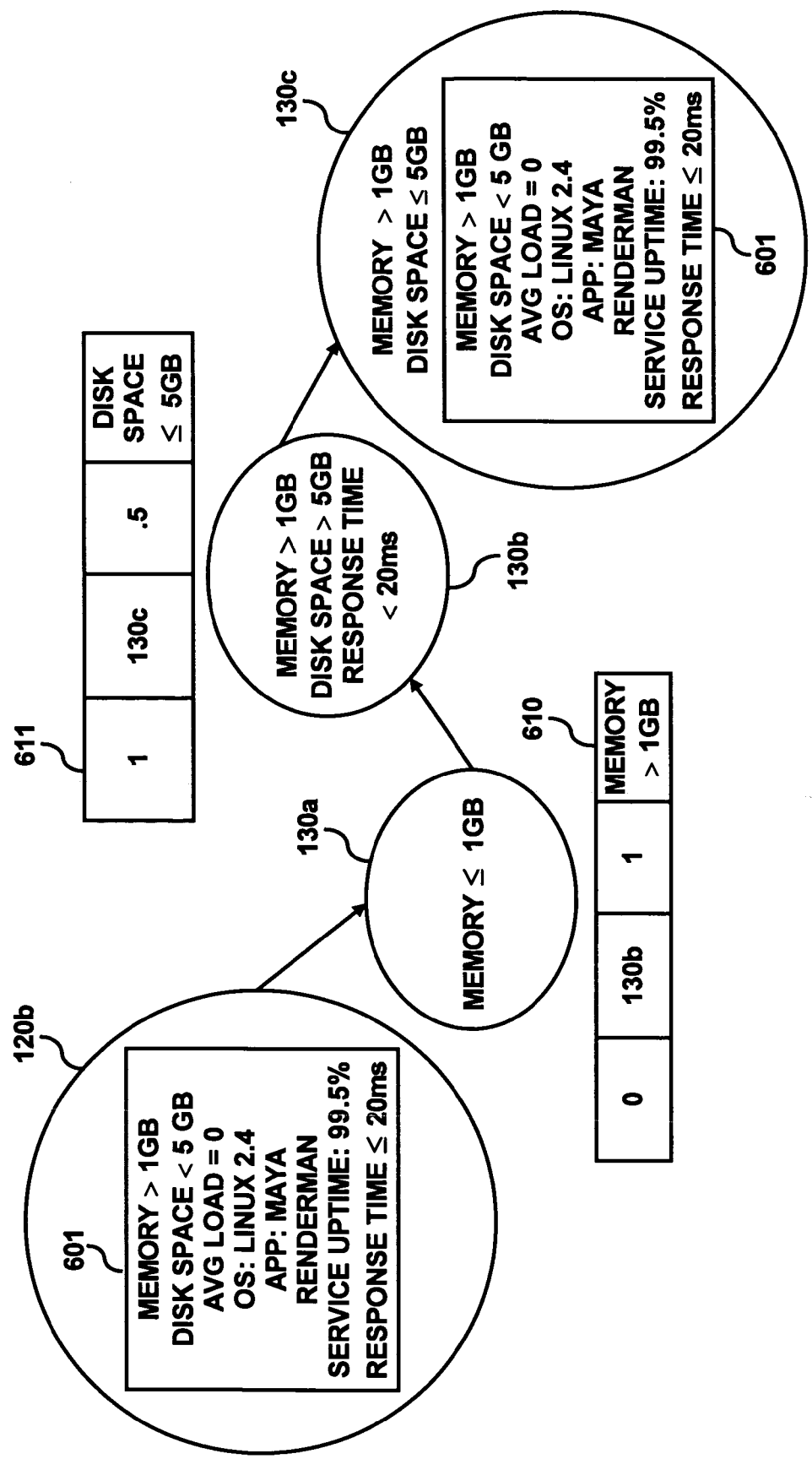
FIG. 6 illustrates routing an advertisement, according to an embodiment.

FIG. 6 illustrates routing an advertisement 601 in the overlay network 210. Advertisements are routed similarly to queries in the overlay network 210. The service nodes 120 periodically measure their attributes and transmit their advertisements including the measured attributes to the overlay network 210. Each advertisement may include an attribute value or a range of attribute values for each attribute in a predetermined set of attributes. An example of a predetermined set of attributes includes memory, disk space, operating system, average load of a service node providing a service, applications, service uptime, and response time of an information service node providing a service.

FIG. 6 illustrates an advertisement 601 generated by the service node 120b. The advertisement 601 includes the following:

TABLE 3 of Attribute Values for the Advertisement 601

Memory: 1 GB
Disk Space: 2.5-5 GB
Operating System: Linux 2.4
Average Load: 0
Applications: Maya, Renderman
Service Uptime: 99.5%
Response Time: < =20 ms The service node 120b may transmit the advertisement 601 to the information service node 130a, because, for example, the information service node 130a is in close proximity to the service node 120b. The advertisement 601 does not fall in the attribute subspace owned by the information service node 130a, because the advertisement 601 has memory>1 GB and the attribute subspace for the information service node 130a includes memory<=1 GB. Thus, the information service node 130a identifies the information service node 130b from an entry 610 in its routing table. For example, the information service node 130b starts with the lowest level entry and searches its routing table for an entry including attribute values that intersect attribute values in the advertisement 601.

The entry 610 identifies the information service node 130b and the advertisement 601 is transmitted to the information service node 130b. The advertisement 601 does not fall in the attribute subspace owned by the information service node 130b, because the disk space in the advertisement 601 is less than or equal to 5 GB. The information service node 130b identifies the information service node 130c from an entry 611 in its routing table that includes the attribute value of disk space<=5 GB. The advertisement 601 falls in the attribute subspace of the information service node 130c and is stored at the information service node 130c. Prior to forwarding the advertisement 601, the information service nodes 130a and 130b store the advertisement 601 in its local cache. In addition, the information service node 130c may copy the advertisement 601 for storage in its global cache and forward the advertisement 601 to other information service nodes including attribute subspaces where the advertisement 601 falls.

4. Distributed Algorithm for Identifying Top K Nodes

Workload is periodically measured by each of the information service nodes 130 in the overlay network 210 shown in FIG. 2. Workload may be calculated from one or more metrics including, but not limited to, the number of advertisements stored, the number of queries processed, the average latency of processing a query, throughput, e.g., queries processed per second, etc.

At the beginning of each epoch, the information service nodes 130 participate in an exchange phase. Each epoch may include a period of time when an exchange phase and/or a dissemination phase are performed. An epoch counter or the time of the beginning of the next epoch may be included in the top K list. The epoch counter or the time of the beginning of the next epoch may be used by an information service node to determine whether a list received by the information service node is for the current epoch. During the exchange phase, a list of top K nodes is routed up a service tree comprised of the information service nodes 130. At the top of the service tree is a leader node, which may be a pre-selected information service node.

Figure 7:
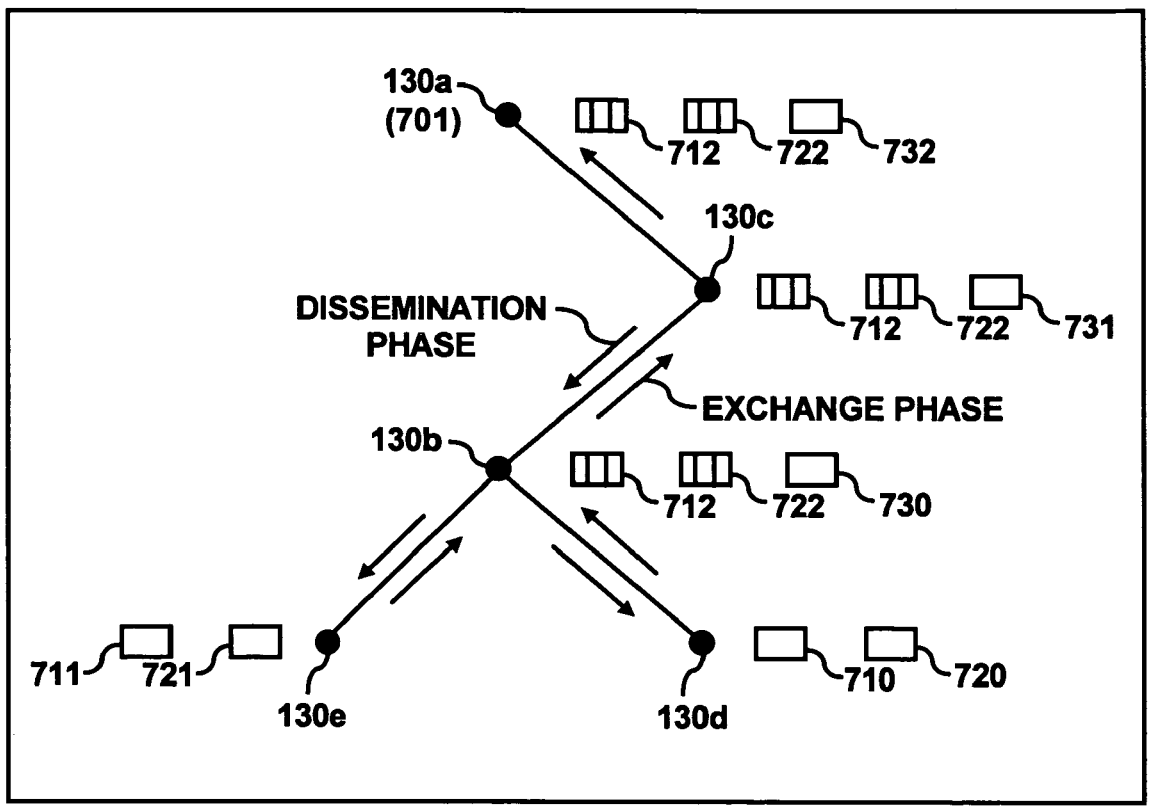
FIG. 7 illustrates an exchange phase and a dissemination phase, according to an embodiment.

A top K list, including the highest workloads measured by the information service nodes 130 in the overlay network 210, is routed through each of the information service nodes 130 in the overlay network 210 to a leader node 701 shown in FIG. 7. As the top K list is routed through each of the information service nodes 130, each information service node compares its measured workload to other workloads in the top K list. If a workload of an information service node receiving the top K list is greater than another workload in the top K list, the information service node includes its workload in the top K list, possibly replacing the smaller workload. The top K list may include a predetermined number of workloads, K. Thus, if the top K list includes less than K workloads, the information service node includes its workload in the top K list. Also, the top K list may initially be comprised of several top K lists. For example, each leaf of a service tree including the information service nodes 130 may originate a top K list. The top K lists may be combined at information service nodes receiving several top K lists. Eventually, the leader node 701 compiles a single top K list.

In addition to the top K list, an L min level vector and a highest routing table value in the overlay network are propagated through the overly network 210. The min level vector includes an L number of minimum routing table levels in the overlay network 210. As the min level vector is routed through each of the information service nodes 130, each information service node compares the highest level of its routing table to other values in the min level vector. If the highest level in the routing table of an information service node receiving the min level vector is smaller than another value in the min level vector, the information service node includes its highest level in the min level vector, possibly replacing the larger value. The min level vector may include a predetermined number of values, L. Thus, if the min level vector includes less than L values, the information service node includes its highest level in the min level vector. Also, the min level vector may initially be comprised of several min level vectors. For example, each leaf of a service tree including the information service nodes 130 may originate a min level vector. The min level vectors may be combined at information service nodes receiving several min level vectors. Eventually, the leader node 701 compiles a single min level vector including L number of values.

The highest level of the routing table in the information service nodes 130 in the overlay network 210, is also routed through each of the information service nodes 130 in the overlay network 210 to the same leader node 701 shown in FIG. 7. As the highest level is routed through each of the information service nodes 130, each information service node compares the highest level of its routing table to the received value. If the highest level in the routing table of the information service node is larger than the received value, the information service node replaces the received value with its own. Each leaf of a service tree including the information service nodes 130 will originate its highest level. These values may be combined at information service nodes receiving several highest level values. Eventually, the leader node 701 compiles a single highest level. The highest routing table level may be included in the L min level vector for convenience and transmitted through the overlay network with the L min level vector.

During the exchange phase, each of the information service nodes 130 includes an identifier in the top K list, such as an IP address, as the top K list is routed to the leader node 701. The identifier is included even if the information service node receiving the top K list does not include its workload in the top K list. In a dissemination phase, the top K list is transmitted down the service tree through each of the information service nodes 130 using the identifiers. For example, the top K list is transmitted to each of the information service nodes 130 in the reverse order from which each information service node received the top K list. Also, when a new information service node joins the information service, in addition to generating a routing table and storing advertisements and queries in the global caches for the new information service node, the new information service node receives the top K list including workloads measured in the last epoch.

The exchange and dissemination phases are further illustrated with respect to FIG. 7. FIG. 7 illustrates a portion of a service tree including the information service nodes 130a-d in the overlay network 210. The leader node 701 is the information service node 130a. During the exchange phase, the information service nodes 130a-d measure their workloads. The top K list of workloads is transmitted up the service tree from the leaves, e.g., information service nodes 130d and 130e to the leader node 701.

The information service nodes 130 generate workload vectors for the top K list and min level vectors for estimating how skewed the service tree is or how balanced the service tree is. The min level vectors may be used to select an information service node for workload splitting while attempting to maintain a balanced service tree.

As shown in FIG. 7, the information service nodes 130d and 130e measure their workloads and generate the workload vectors 710 and 711 respectively. The workload vectors in the overlay network 210 including the K highest workloads are combined to form the top K list. Each workload vector includes at least the identification of the information service node and the measured workload.

The information service nodes 130d and 130e also generate min level vectors 720 and 721 respectively. The min level vectors include the highest level in the routing table for the information service node. Examples of highest levels for the information service nodes 130a-d are shown in FIGS. 8A-D and include 0, 2, 1, and 2, respectively. The min level vectors are used to form an L min level list including the L lowest levels in the overlay network 210. The L min level list also includes an information service node ID and routing table level for the information service node having the highest level in the overlay network 210.

Several top K lists may be exchanged during the exchange phase and combined at intermediate nodes, such as the information service node 130b. For example, the workload vectors 710 and 711 are top K lists transmitted to the information service node 130b. Assuming that K is three, the information service node 130b combines the workload vectors 710 and 711 and its own workload vector into the top K list 712. The top K list 712 is transmitted towards the leader node 701 and may include the workloads of the information service nodes 130c and/or 130a if their workloads are higher than the workloads in the top K list 712 received by each information service node.

Also, during the exchange phase, the min level vectors 720 and 721 are transmitted to the information service node 130b. The information service node 130b combines the min level vectors 720 and 721 and its own min level vector into the L min level list 722 (also referred to as the L min level vector). The L min level list is transmitted towards the leader node 701 and may include the highest routing table levels for information service nodes 130c and/or 130a if their levels are less than the levels in the L min level list. In addition, the L min level list includes the service node having the highest level in the overlay network 210. The difference between the highest routing table level and the minimum level of an information service node initially selected for workload splitting may be compared to a threshold to determine whether the initially selected information service node remains the selection for workload splitting. This comparison is one technique for maintaining a balanced service tree.

Also, during the exchange phase, the order of the information service nodes receiving the top K list is stored at the information service node 130 such that top K list may be disseminated to all the information service nodes during the dissemination phase. For example, order information 730 includes identifications, such as IP addresses, of the information service nodes 130e and 130d, such that the information service node 130b transmits the top K list 712 to the information service nodes 130e and 130d during the dissemination phase. Other examples of order information include order information 731 at the information service node 130c, such as the IP address of the information service node 130b, and order information 732 at the information service node 130a, such as the IP address of the information service node 130c. Thus, during the dissemination phase, the top K list 712 is transmitted down the service tree to all the information service nodes 130. The K min level list is also transmitted down the service tree during the dissemination phase.

A top K routing algorithm is used for determining which information service node to transmit the top K list to based on the routing table in the information service node transmitting the top K list. For example, FIGS. 8A-D illustrate the routing tables for the information service nodes 130a-d. To route the top K list to the leader node, an information service node receiving the top K list transmits the top K list to the maximum level in its routing table which is responsible for the range below a corresponding splitting value. The information in the top K list identifies the top K nodes and their workloads known so far as the top K list is routed to the leader node. For example, referring to the routing table for the information service node 130*d* in the FIG. 8D, the highest or maximum level is in the entry 840 with a level of 2. The entry 840 includes an attribute splitting value of 20 ms for the response time attribute. The range for response time includes: response time<=20 ms. Because the range is below the corresponding splitting value, i.e., less than the 20 ms splitting value, the node 130*b* is identified as the next node for receiving the top K list. The node 130*d* transmits the top K list to the node 130*b*.

Figure 8A:
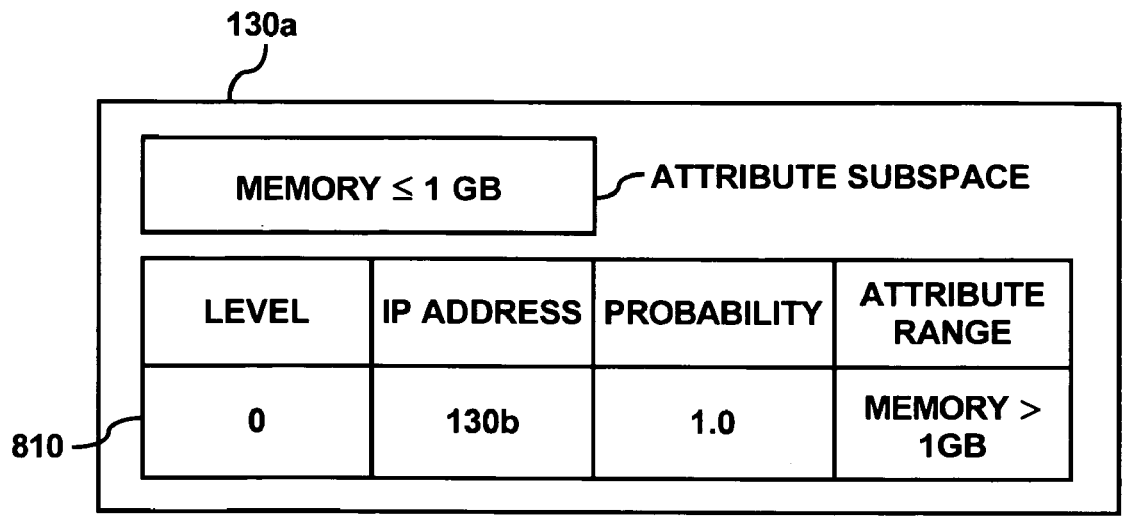
FIGS. 8A-D illustrate routing tables for information service nodes, according to an embodiment.
Figure 8B:
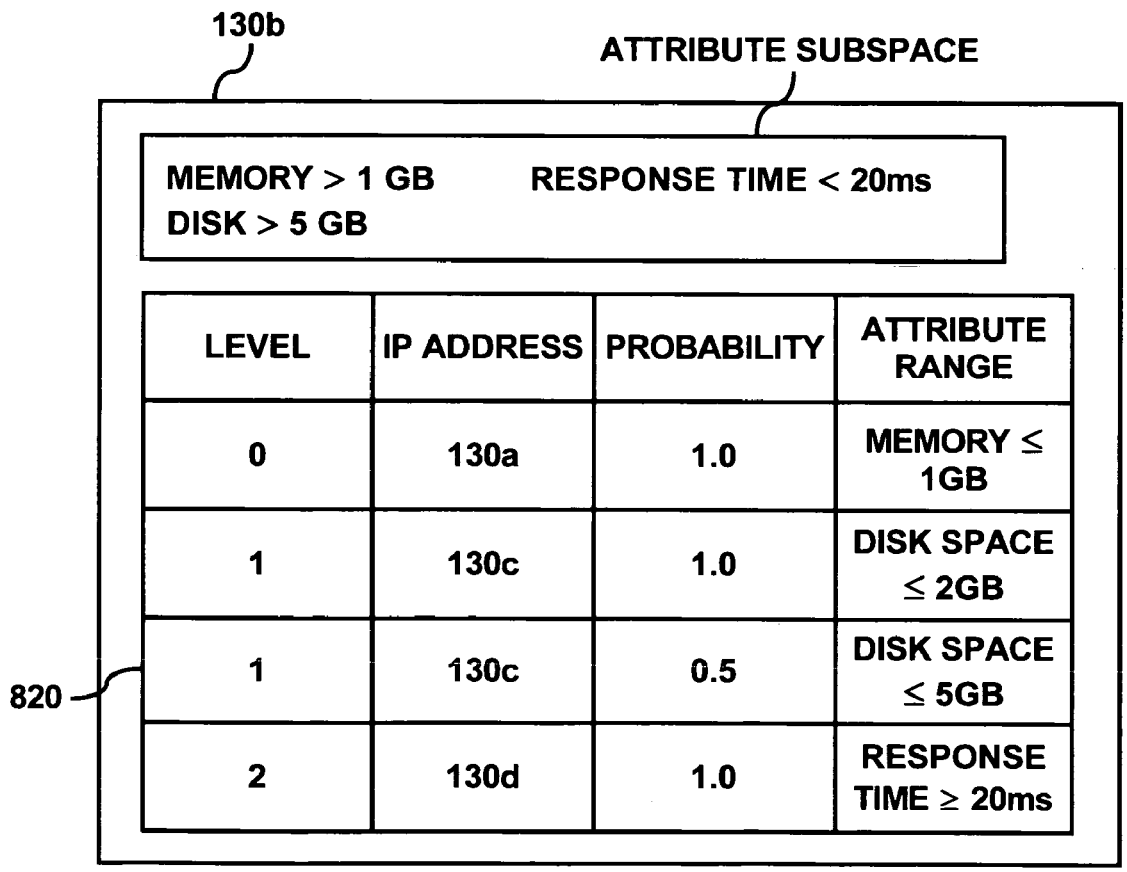

The information service node 130*b* receives the top K list and based on the top K routing algorithm uses the entry 820 of the routing table for the information service node 130*b* shown in FIG. 8*b* to identify the information service node 130*c* as the next information service node to receive the top K list. The information service node 130*b* includes its workload in the top K list and transmits the top K list to the information service node 130*c*.

In this example, the value of K=3. Also, the information service node 130*c* receives the workloads of the information service nodes 130*b*, 130*d*, and 130*e*, such as shown in FIG. 7. If the workload of the information service node 130*c* is less than the workloads of the information service nodes 130*b*, 130*d*, and 130*e*, then the information service node 130*c* does not include its workload in the top K list. The entry 830 of the routing table for the information service node 130*c* identifies the information service node 130*a* as the next node for receiving the top K list based on the top K routing algorithm. The information service node 130*a* determines whether its workload is greater than the three workloads in the top K list. If so, the information service node 130*a* includes its workload in the top K list. Also, the information service node 130*a* is the leader node. The leader node is the information service node with only attribute ranges greater than a corresponding splitting value in its routing table. The routing table for the information service node 130*a* shown in FIG. 8A includes one entry 810. The entry 810 includes an attribute range greater than the corresponding splitting value of 1 GB. Thus, the routing table of the information service node 130*a* only includes attribute ranges greater than a corresponding splitting value and the information service node 130*a* is the leader node. In contrast, the routing tables of the information service nodes 130*b-d* include at least one attribute range less than a corresponding splitting value, such as the entries 820, 830, and 840.

After the leader node receives the top K list, the dissemination phase begins. As shown in FIG. 7, the leader node, e.g., the information service node 130*a*, transmits the top K list to the information service node 130*c*. The top K list is eventually disseminated to all the information service nodes, for example, in the reverse order from which the information service nodes previously received the top K list as it was routed up the service tree towards the leader node.

The top K list includes a list of K highest workloads in the overlay network 210. A list as used herein includes a data representation of one or more values that can be transmitted between nodes. For example, the top K list includes values for the largest workloads in the overlay network 210. These values are transmitted between the information service nodes 130. In addition to including workloads, the top K list includes an identifier of the information service node having the workload in the top K list. One example of an identifier is an IP address but other identifiers may be used.

Figure 8C:
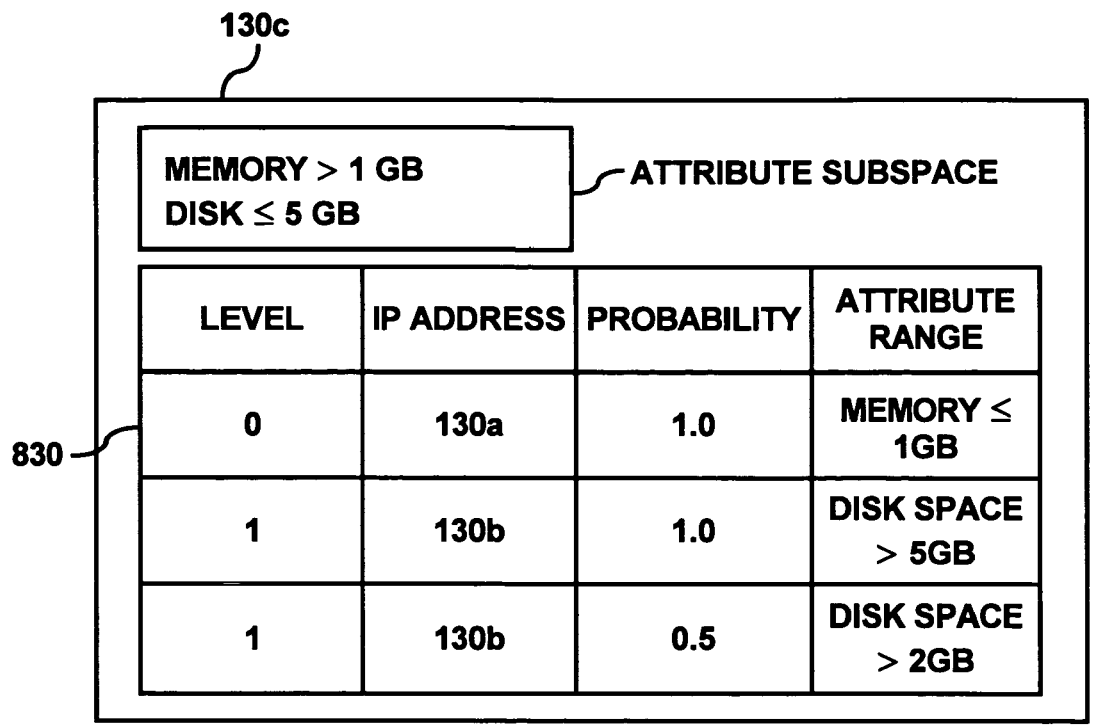
Figure 8D:
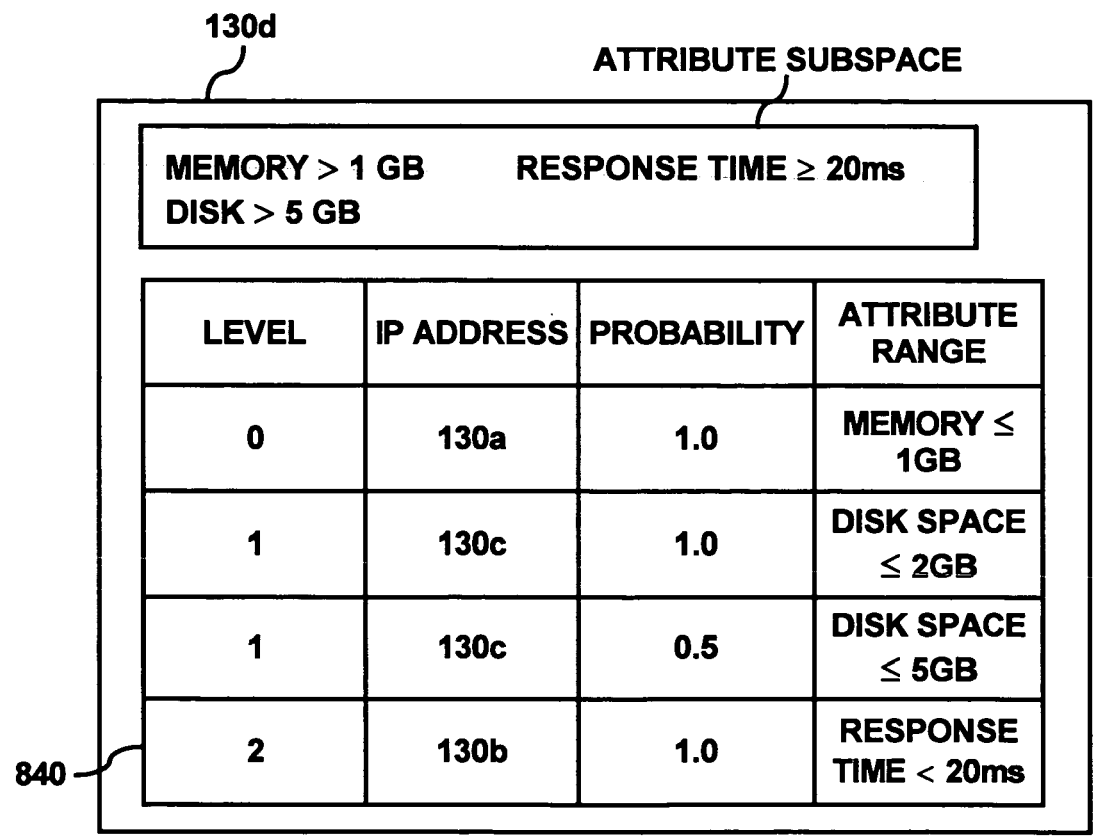
Figure 9:
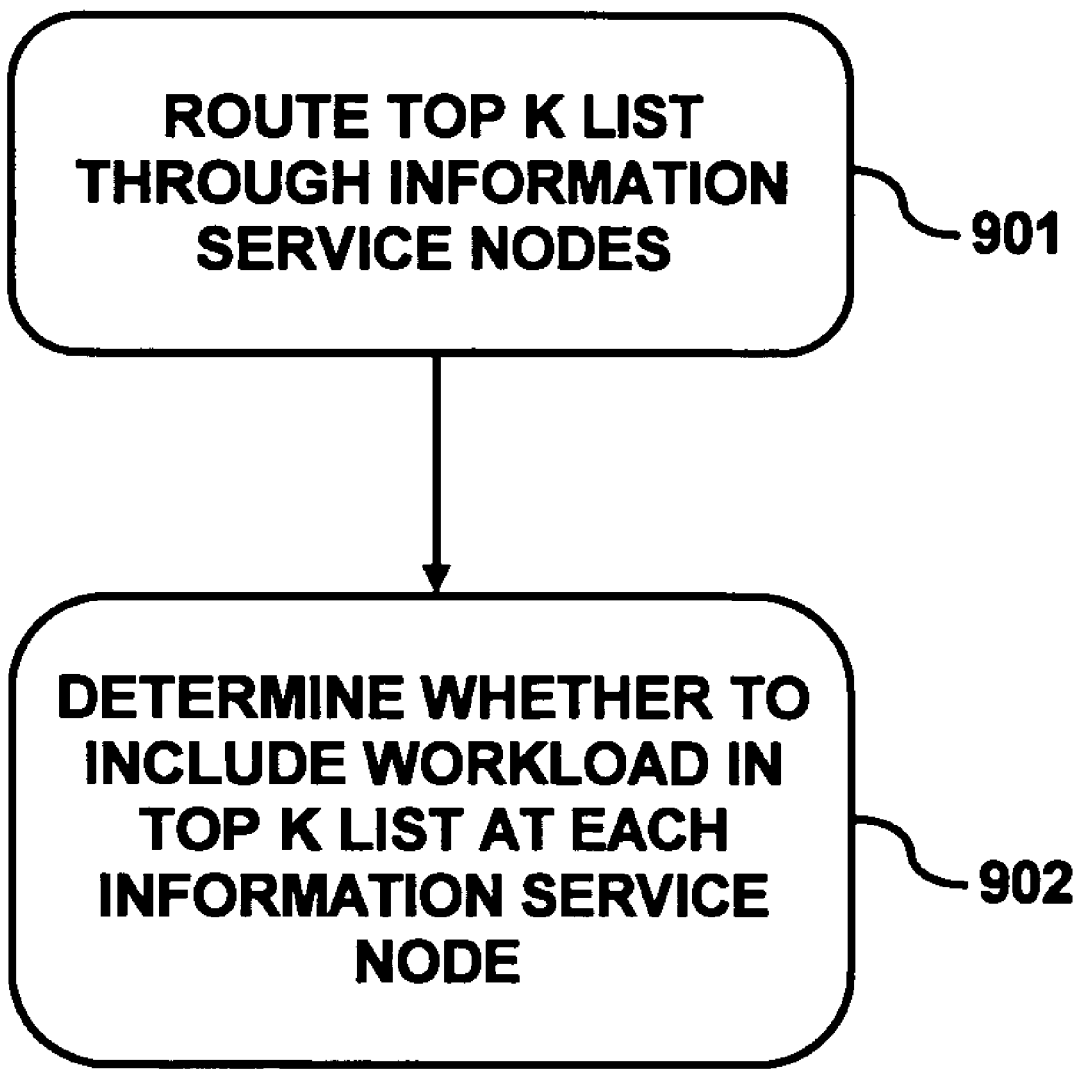
FIG. 9 illustrates a flow chart of a method including steps in an exchange phase, according to an embodiment.

FIG. 9 illustrates a method 900 including steps in the exchange phase, according to an embodiment. The method 900 is described with respect to FIGS. 1-8 by way of example and not limitation. At step 901, the top K list is routed through the information service nodes 130 in the overlay network 210 to a final destination in the overlay network 210. In one example, the final destination includes the leader node 130*a* shown in FIG. 7. During the exchange phase, the leader node 130*a* shown in FIG. 7 receives the top K list including an identification of the information service nodes having the top K highest workloads in the overlay network 210 shown in FIG. 2. The leader node is the information service node with a routing table only having an attribute range or attribute ranges greater than a corresponding splitting value in its routing table. The leader node may be initially selected by an administrator. A robust information service node may be selected as the leader node.

At step 902, which may be performed by the information service nodes 130 as the top K list is routed to the final destination, each information service node receiving the top K list determines whether to include a workload of a respective node receiving the list. For example, as shown in FIG. 7, the information service node 130*c* receives the top K list from the information service node 130*b* during the exchange phase. If the workload of the information service node 130*c* is less than the workloads of the information service nodes 130*b* and 130*d*, then the information service node 130*c* does not include its workload in the top K list for K=2. If the information service node 130*c* determines its workload is greater than the two workloads in the top K list, the workload of the information service node 130*c* is included in the top K list and the top K list is routed toward the final destination, such as the leader node 130*a*.

Figure 10:
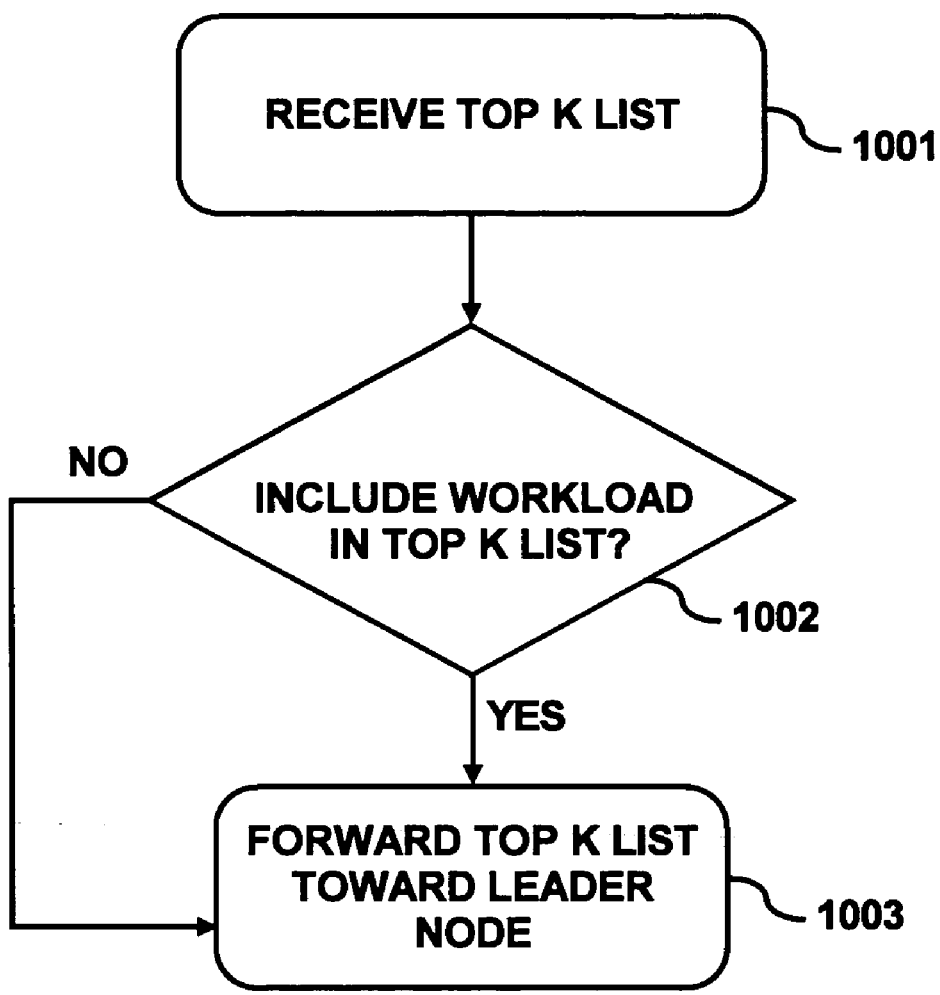
FIG. 10 illustrates a flow chart of a method for a top K routing algorithm, according to an embodiment.

FIG. 10 illustrates a flowchart for a method 1000 for the top K routing algorithm performed at a node, such as an information service node, according to an embodiment. The method 1000 is described with respect to FIGS. 1-8 by way of example and not limitation.

At step 1001, the information service node 130*b* shown in FIG. 7 receives the top K list. At step 1002, the information service node 130*b* determines whether to include its workload in the top K list. For example, the information service node 130*b* includes its workload in the top K list if its workload is greater than another workload in the top K list or if the top K list does not include a K number of workloads yet. For example, referring to the example of FIG. 7, if K=2, the information service node 130*b* includes its workload in the top K list because the top K list includes one workload for the information service node 130*d*. At step 1003, the information service node 130*b* forwards the list toward a leader node in the peer-to-peer, overlay network 210. For example, the information service node 130*b* identifies from its routing table a highest level entry including an attribute range less than or equal to an attribute splitting value. As shown in FIG. 8*b* of the routing table for the information service node 130*b*, the highest level entry including an attribute range less than or equal to an attribute splitting value is the entry 820. The information service node 130*c* is identified from the entry 820, and the top K list is transmitted to the information service node 130*c*.

The routing tables shown in FIGS. 8B-D may be generated based on splitting algorithms used to balance workloads for the information service nodes having the highest workloads, such as identified in the top K list. One local splitting algorithm may include splitting a workload of a second node in the overlay network with a first node based on an at least one attribute splitting value for the second node. The first node may include a new node joining the overlay network 210. The new node is assigned an attribute subspace based on the splitting value. Substantially, all the entries in the routing table of the second node are copied to the routing table of the first node and at least one new highest level entry in the routing table of the first node is generated for the routing table of the first node based on the at least one attribute splitting value.

Figure 11:
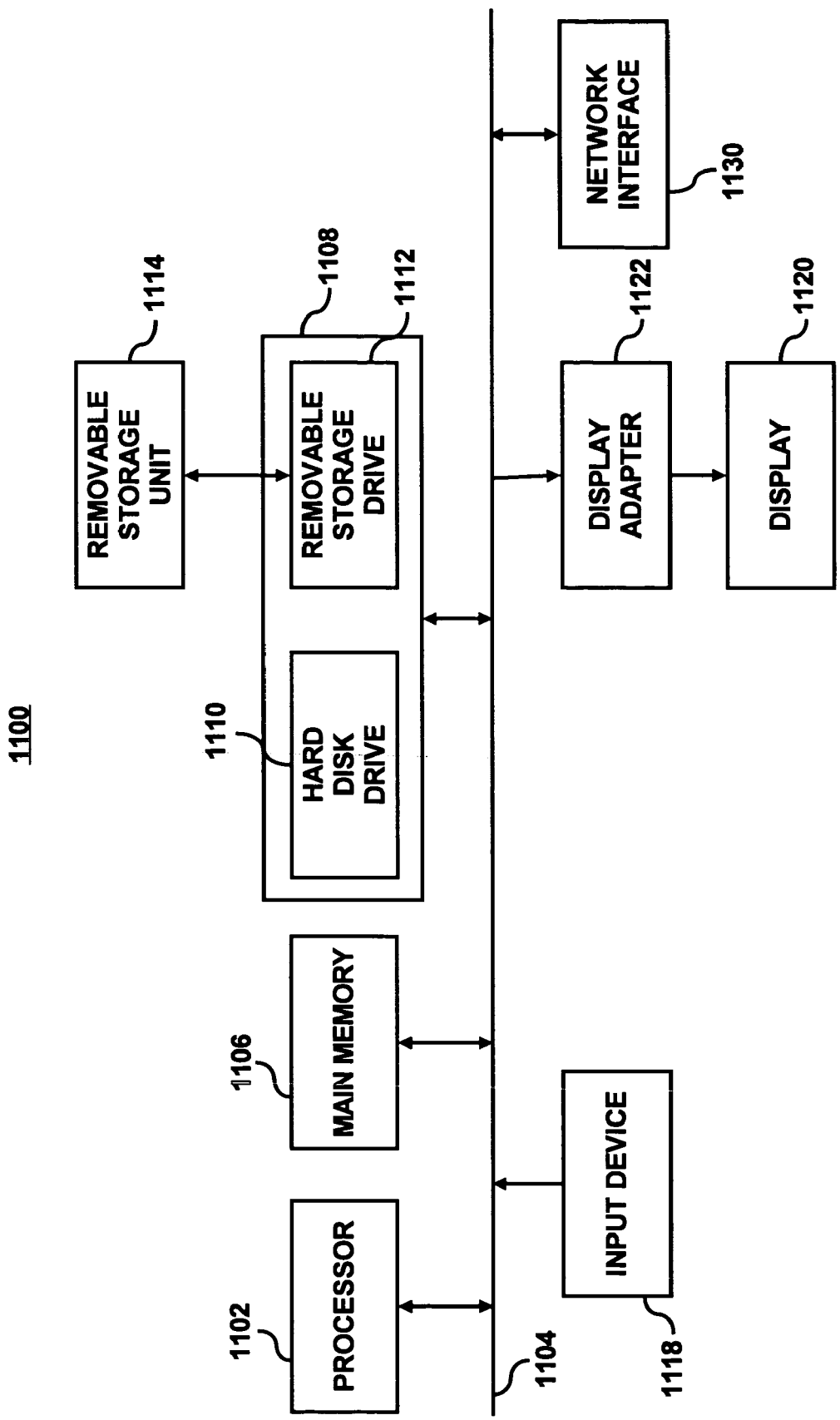
FIG. 11 illustrates a computer system, according to an embodiment.

FIG. 11 illustrates an exemplary block diagram of a computer system 1100 that may be used as an information service node in the overlay network 210. The computer system 1100 includes one or more processors, such as processor 1102, providing an execution platform for executing software.

Commands and data from the processor 1102 are communicated over a communication bus 1104. The computer system 1100 also includes a main memory 1106, such as a Random Access Memory (RAM), where software may be resident during runtime, and a secondary memory 1108. The secondary memory 1108 includes, for example, a hard disk drive 1110 and/or a removable storage drive 1112, representing a floppy diskette drive, a magnetic tape drive, a compact disk drive, etc., or a nonvolatile memory where a copy of the software may be stored. The secondary memory 1108 may also include ROM (read only memory), EPROM (erasable, programmable ROM), EEPROM (electrically erasable, programmable ROM). In addition to software, routing tables, the global information table, and measured QoS characteristics, measured available bandwidth and bandwidth required for services may be stored in the main memory 1106 and/or the secondary memory 1108. The removable storage drive 1112 reads from and/or writes to a removable storage unit 1114 in a well-known manner.

A user interfaces with the computer system 1100 with one or more input devices 1128, such as a keyboard, a mouse, a stylus, and the like. The display adaptor 1122 interfaces with the communication bus 1104 and the display 1120 and receives display data from the processor 1102 and converts the display data into display commands for the display 1120. A network interface 1130 is provided for communicating with other nodes via the network 200 shown in FIG. 1.

One or more of the steps of the methods 700, 800 and 900 may be implemented as software embedded on a computer readable medium, such as the memory 1106 and/or 1108, and executed on the computer system 1100, for example, by the processor 1102. The steps may be embodied by a computer program, which may exist in a variety of forms both active and inactive. For example, they may exist as software program(s) comprised of program instructions in source code, object code, executable code or other formats for performing some of the steps. Any of the above may be embodied on a computer readable medium, which include storage devices and signals, in compressed or uncompressed form.

Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated below may be performed by any electronic device capable of executing the above-described functions.

While the embodiments have been described with reference to examples, those skilled in the art will be able to make various modifications to the described embodiments without departing from the true spirit and scope. The terms and descriptions used herein are set forth by way of illustration only and are not meant as limitations. In particular, although the methods have been described by examples, steps of the methods may be performed in different orders than illustrated or simultaneously. Those skilled in the art will recognize that these and other variations are possible within the spirit and scope as defined in the following claims and their equivalents.

What is claimed is:

1. A method of determining a set of nodes having a highest workload from nodes in a network for an information service, the method comprising:
   routing a list of the set of nodes having highest workloads in the network through nodes in the network to a final destination in the network, wherein, at a node receiving the list as the list is routed to the final destination, the routing further includes
      identifying a highest level entry in a routing table of the node receiving the list including an attribute range less than or equal to an attribute splitting value;
      identifying a node from the highest level entry; and
      transmitting the list to the node in the identified highest level entry; and
   at each node receiving the list as the list is routed to the final destination, determining whether to include a workload of a respective node receiving the list.

2. The method of claim 1, wherein at each node receiving the list as the list is routed to the final destination, determining whether to include a workload of a respective node receiving the list further comprises:
   determining whether a workload of the respective node receiving the list is greater than a workload for another node in the list; and
   adding to the list the workload of the respective node receiving the list in response to the workload of the respective node receiving the list being greater than the workload for the another node in the list.

3. The method of claim 2, wherein the list includes a predetermined number of workloads.

4. The method of claim 1, further comprising:
   including in the list an identification of each node receiving the list as the list is routed to the final destination.

5. The method of claim 4, further comprising:
   transmitting the list from the final destination to each of the nodes that had received the list as the list was routed to the final destination using the identifications.

6. The method of claim 1, wherein each of the nodes in the network are operable to store information about services available in a network and are operable to respond to queries about the services.

7. The method of claim 1, wherein a workload for the respective node receiving the list is associated with at least one of a number of advertisements stored, a number of queries processed, a number of queries processed per second, and latency.

8. The method of claim 1 wherein the network is an overlay network, the method further comprising:
   generating an overlay routing table in a first node in the overlay network.

9. The method of claim 8, wherein generating an overlay routing table in a first node in the overlay network further comprises:
splitting a workload of a second node in the overlay network with the first node based on an at least one attribute splitting value for the second node;
copying substantially all entries in a routing table of the second node to a routing table of the first node; and
including at least one new highest level entry in the routing table of the first node based on the at least one attribute splitting value.

10. The method of claim 9, further comprising:
determining the at least one attribute splitting value based on a splitting algorithm for balancing the workload of the second node between the first node and the second node.

11. The method of claim 9, wherein the first node is a node joining the overlay network.

12. The method of claim 9, wherein routing a list of the set of nodes having a highest workload in the overlay network through nodes in the overlay network to a final destination in the overlay network further comprises:
routing the list through the nodes in the overlay network to the final destination using at least the routing tables of the first and second nodes.

13. The method of claim 1, further comprising:
selecting a leader node, wherein the leader node is the final destination in the network.

14. The method of claim 1, wherein the final destination is a node in the network that only includes attribute ranges greater than a corresponding attribute splitting value in its routing table.

15. The method of claim 1, further comprising:
including in the list at least one of an epoch counter value and a time of the beginning of a next epoch.

16. The method of claim 1, further comprising:
storing order information at substantially each node in the network, the order information being used to disseminate the list to nodes in the network.

17. The method of claim 1, further comprising:
routing a K min level list through nodes in the network, wherein the K min level list includes a set of K nodes having lowest routing table levels in the network.

18. The method of claim 17, wherein the K min level list further comprises a highest routing table level in the network.

19. The method of claim 18, further comprising:
balancing the workloads of nodes in the network using the K min level list.

20. The method of claim 1, wherein the list comprises a plurality of lists, the method further comprising:
at a node receiving at least two of the plurality of lists, combining the at least two lists into a single list such that the single list includes K number of highest workloads from the at least two lists.

21. A method comprising:
receiving a list of workloads for nodes in a network;
determining whether to include a workload in the list for a node receiving the list, wherein the determining further includes
determining whether a workload of the node receiving the list is greater than a workload of another node in the list; and
adding to the list the workload of the node receiving the list in response to the workload of the receiving the list being greater than the workload of the another node in the list; and
forwarding the list toward a final destination in the network.

22. The method of claim 21, wherein the list includes a predetermined number of workloads.

23. The method of claim 21, wherein forwarding the list toward a final destination in the network further comprises:
identifying a highest level entry in a routing table of the node receiving the list including an attribute range less than or equal to an attribute splitting value; and
identifying a node from the highest level entry; and
transmitting the list to the node in the identified highest level entry.

24. The method of claim 21, wherein the nodes in the network are operable to provide a distributed information service for services available in a network.

25. The method of claim 21, wherein the final destination comprises a leader node.

26. The method of claim 21, further comprising:
receiving a K min level list of routing table levels for nodes in the network;
determining whether to include a routing table level of a node receiving the K min level list in the list; and
forwarding the K min level list toward a final destination in the network.

27. The method of claim 21, wherein receiving a list of workloads for nodes in a network further comprises:
receiving a plurality of lists of workloads for nodes in a network; and
combining the lists into a single list of a predetermined number of workloads.

28. A node in a network comprising:
means for receiving a list of workloads for nodes in the network;
means for determining whether to include a workload of the node in the list, wherein the means for determining is further configured to determine whether a workload of the node receiving the list is greater than a workload of another node in the list, and configured to add to the list the workload of the node receiving the list in response to the workload of the receiving the list being greater than the workload of the another node in the list; and
means for forwarding the list toward a final destination in the network.

29. The node of claim 28, further comprising:
means for generating a routing table used by the means for forwarding the list toward the final destination.

30. The node of claim 28, wherein the node is a node in a peer-to-peer overlay network operable to provide information for at least one service available in the network.

31. The node of claim 30, wherein the peer-to-peer, overlay network comprises a distributed information service operable to provide information for services available in the network.

32. The node of claim 28, further comprising:
means for combining a plurality of lists of workloads into a single list including a predetermined number of workloads.

33. The node of claim 28, further comprising:
means for determining a highest routing table level in the node; and
means for including the highest routing table level in a list of lowest routing table in the network if the highest routing table level is lower than a routing table level in the list.

34. Computer software stored on a computer readable storage medium in a node in a network, the computer software comprising instructions performing:

determining whether to include a workload of the node in a list of highest workloads for nodes in the network, wherein the determining further includes
   determining whether the workload for the node is greater than a workload in the list for another node; and
   adding to the list the workload of the node in response to the workload of the node receiving the list being greater than the workload in the list; and
identifying another node in the network to transmit the list from a routing table for the node.

35. The computer software embedded stored on a computer readable storage medium of claim 34, wherein identifying another node in the network to transmit the list from a routing table for the node further comprises:
   identifying a highest level entry in the routing table including an attribute range less than or equal to an attribute splitting value; and
   identifying the another node from the highest level entry.

* * * * *

UNITED STATES PATENT AND TRADEMARK OFFICE
CERTIFICATE OF CORRECTION

PATENT NO.         : 7,636,325 B2                                              Page 1 of 1
APPLICATION NO.    : 11/006068
DATED              : December 22, 2009
INVENTOR(S)        : Sujoy Basu et al.

It is certified that error appears in the above-identified patent and that said Letters Patent is hereby corrected as shown below:

In column 20, line 1, in Claim 35, after "software" delete "embedded".

Signed and Sealed this

Fifth Day of October, 2010

David J. Kappos
*Director of the United States Patent and Trademark Office*